US005596639A
USOO5596639A

United States Patent [19]
Kikinis

[11] Patent Number: 5,596,639
[45] Date of Patent: *Jan. 21, 1997

[54] CD-PROM

[75] Inventor: Dan Kikinis, Saratoga, Calif.

[73] Assignee: Elonex IP Holdings Ltd., London, England

[*] Notice: The term of this patent shall not extend beyond the expiration date of Pat. No. 5,563,947.

[21] Appl. No.: 380,049

[22] Filed: Jan. 30, 1995

Related U.S. Application Data

[63] Continuation-in-part of Ser. No. 97,767, Jul. 26, 1993.
[51] Int. Cl.$^6$ .................................................. H04L 9/00
[52] U.S. Cl. .................................. 380/4; 380/49; 380/25
[58] Field of Search .............................. 380/3, 4, 49, 23, 380/25

*Primary Examiner*—David C. Cain
*Attorney, Agent, or Firm*—Donald R. Boys

[57] ABSTRACT

Data on a CD-PROM disk is selectively accessed in a secure manner by selectively encoding binary digital passwords and decryption keys onto the same disk in a separate area. Passwords and decryption keys may be programmed onto the disk after manufacture, such as at the point of sale, by selectively obliterating the readability of bits in addressable sectors. A binary digital key is then later recognized as the result of a string of addressable sectors, with the readable and unreadable sectors providing the digital string. In an embodiment, a manufacturer may place several or all versions and features of a large program on a single CD-ROM, encrypted, and later provide keys to enable only selected ones of the features and versions for retrieval. By programming a password or decryption key over an area of a programming region having a storage capacity of at least a megabyte, and in some cases several megabytes, existing methods of intercepting and defeating such security schemes may be defeated.

9 Claims, 4 Drawing Sheets

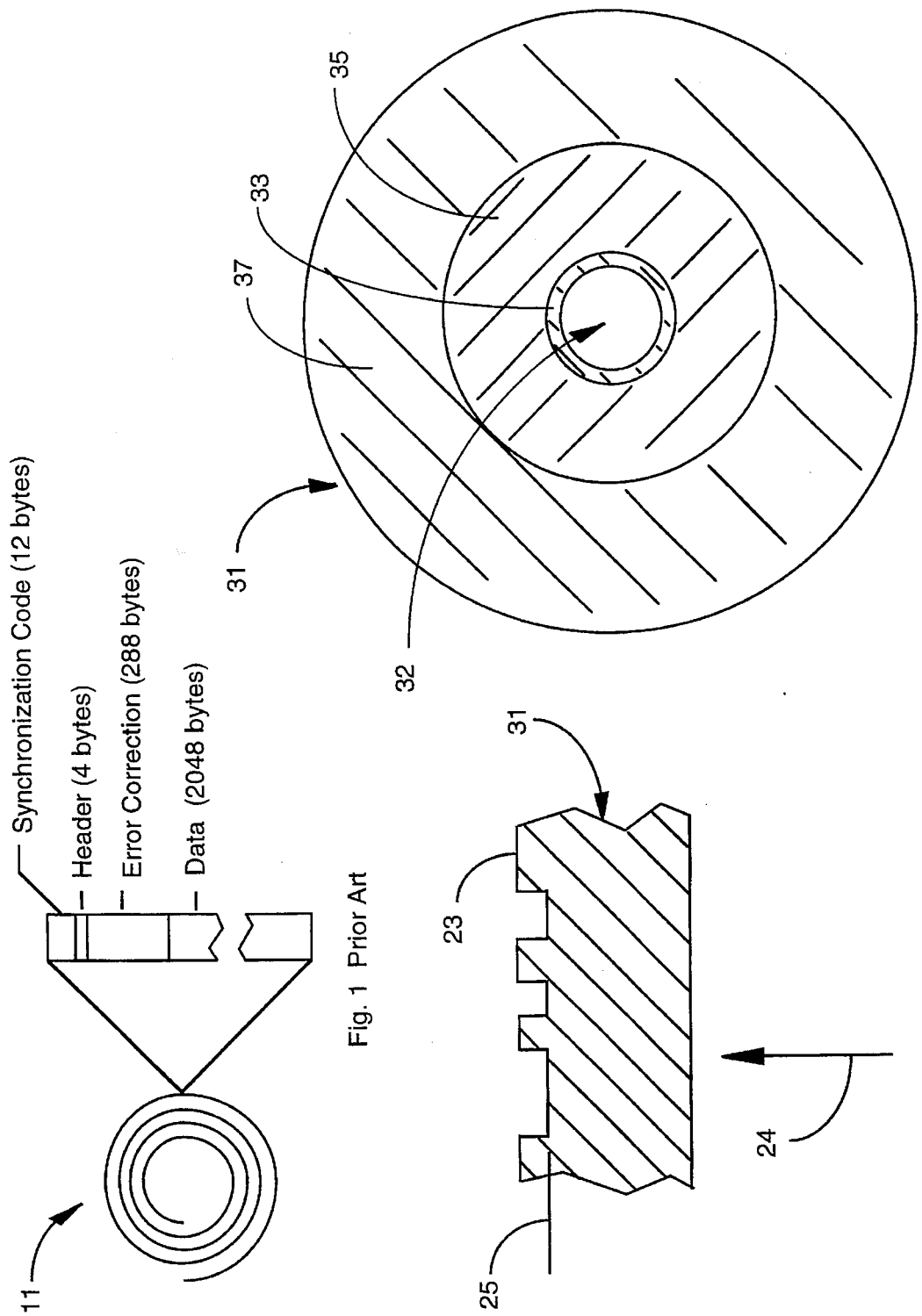

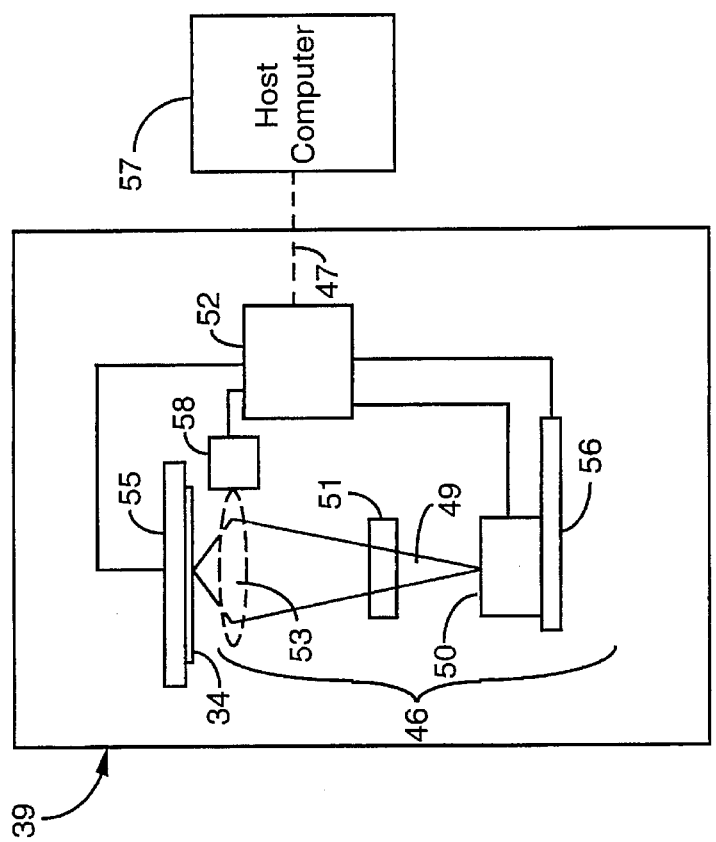
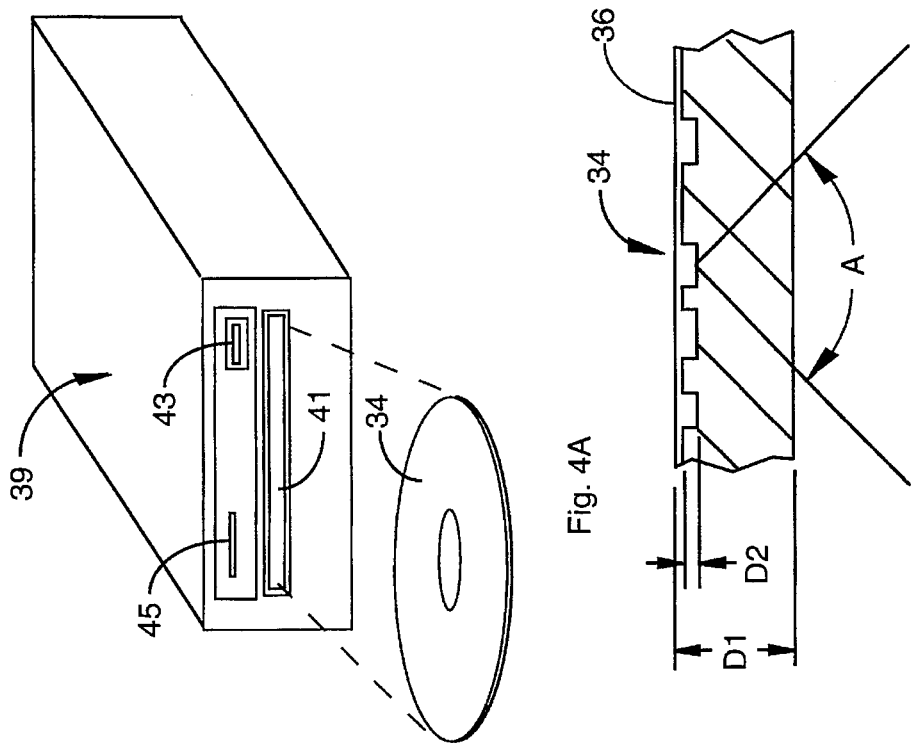

CD-PROM

CROSS REFERENCE TO RELATED DOCUMENTS

This application is a continuation-in-part of application Ser. No. 08/097,767, filed Jul. 26, 1993, with the same title, which is incorporated in its entirety by reference herein pending.

FIELD OF THE INVENTION

The present invention is in the area of Compact Disk Read-Only Memory (CD-ROM) disks and pertains more specifically to programmable access control of data on such disks.

BACKGROUND OF THE INVENTION

CD-ROM is an extension of CD audio, the high-quality disk technology of the music industry. A conventional CD-ROM disk, measuring only 4¾ inches in diameter is capable of storing an equivalent of up to 250,000 pages of text, 1,500 floppy disks, 74 minutes of audio, or thousands of images, any of which can be retrieved in seconds by a computer-based CD-ROM player. CD-ROM products are available to users in a wide variety of fields such as library science, education, publishing, online database services, government, banks, insurance, law, engineering, and medicine.

CD-ROM disks typically have a single, spiraling track that is about three miles long. The track is typically read from the inside out. Data on the track is divided into sectors, each equal in length, containing equal amounts of information and having absolute addresses. FIG. 1 illustrates a standard data format. In this format, each sector 13 on CD-ROM disk 11 comprises 2,352 bytes of information with 12 bytes of synchronization, 4 bytes of identification, 288 bytes of error-correction code and 2,048 bytes of data.

A CD-ROM master is made by use of a high-power laser to form a series of tiny indentions in the surface of a blank forming the single spiral track. The pattern and length of the indentions along the track represent the recorded information digitally. The original blank is used to make a master, typically of wear resistant material, for use in molding replicas, which become the familiar CD-ROM disks. The pattern from the master disk is reproduced on the surface of a polymer substrate, which is then a copy of the original.

The stamped replicas are coated with a highly reflective material, typically vapor deposited aluminum, and a protective coating is applied over the thin reflective film.

Early CD-ROM disks comprised digitized analog information designed to be used primarily in linear format with limited user control of playback. Other CD-ROM disks were programmed to use the disk player's microprocessor and limited internal memory. Today's more highly developed CD-ROM systems provide potentially limitless interactivity as their programs are typically under the supervision of an external computer.

To read CD-ROM data a laser-equipped drive in a CD-ROM player changes its rate of spin, turning the disk more slowly as sectors farther from the disk center are read. As the disk is spinning, the low-power read laser is focused on the spiral track through the thickness of the polymer disk, and reflected light is picked up by a photodetector that converts the presence or absence of indentions into electrical signals interpreted as digital data by the computer. The read laser "sees" the indentions from the side opposite where they were produced, and therefore sees an indention as a protrusion toward the laser source.

When the read laser encounters the land of an indention, the focused light from the laser is largely scattered, so the light reflected to the photodetector is diminished. In the area where there is no indention from the opposite side, more light is reflected to the photodetector.

FIG. 2 illustrates a series of indentions formed in the surface of a CD-ROM disk 31. Surface 23 is the original disk surface, and level 25 indicates the level of penetration into the original surface of the formed indentions. The Figure is not to scale, as the indentions are almost infinitesimally small in depth relative to the thickness of the disk. The read laser operates in the direction of arrow 24.

CD-ROM, much like other high-density storage systems, relies on channel codes for storage and retrieval of data. The channel code typically used for CD-ROM is called eight-to-fourteen modulation (EFM).

In the EMF system, each time the moving disc translates an "edge" past the laser beam, the reflected light intensity changes, signalling a transition 27 that is decoded as binary 1 by the host's reading system. Binary 0's occur everywhere else, and the number of 0's between "1" transitions is a function of the length along the spiral track of the land between indentions. In operation, the channel code is converted into digital bytes and data blocks by reference to stored look-up tables. The typical system of encoding and decoding is well known in the art.

A complete CD-ROM file system consists of three major components: logical format, which defines the disk's directory structure and operating characteristics through decoder programs that determine such matters as where to find the directory of the files on the CD-ROM disk, how the directory is structured, and how to perform error correction on disk data; origination programs, which write the data on the disk according to the logical format; and destination programs, the reading component on the host computer that understands the logical format and can use it to provide access to the files on the CD-ROM and read and translate the data structure.

Most CD-ROM disks have their own operating systems that respond to calls from a file manager that is exclusively used by CD-ROM. CD-ROM disks also contain their own search decoder programs that define where sectors are located so the computer knows where to locate the stored data. These search decoders typically have a menu-driven interface on the computer. CD-ROM programs typically require 640 kilobytes of computer memory to run, and may allocate their own storage addresses on the computer's hard disk for its data access driver and destination programs.

Nearly all CD-ROM disks and CD-ROM players available today conform to what is known as the High Sierra standard or to a more recent upgrade, the ISO 9660 standard. The connection between CD-ROM players and computers also has been for the most part standardized. CD-ROM players typically use the Small Computer Systems Interface (SCSI) to link with a computer.

CD-ROMs appear to be reasonable and convenient vehicles for marketing large application programs rather than using large numbers of floppy disks. They easily provide enough space and their cost is low, about $0.50 a disk when produced in large volumes. The cost of CD-ROM drives is also becoming more reasonable as well.

Despite apparent advantages, there remain some serious drawbacks to use of CD-ROMs for marketing large application packages. The most serious is that there is no reliable method or mechanism whereby comprehensive versions and features may be recorded on a single disk, and only certain portions enabled for a particular customer.

Also the lack of satisfactory copy protection of CD-ROM disks remains a problem. CD-ROM disks are typically shipped with a companion floppy disk that contains data access driver and destination programs that must be installed on the user's computer in order for CD-ROM to run. The floppy is copy-protected but the CD-ROM disk is not. This method of copy protection is no more effective than copy protection for floppies in general. The contents of CD-ROM can be copied to hard disk and the floppy protection scheme can be defeated by any of a number of available copy programs.

Multi-application packages such as Ethernet, Windows, and AutoCad, and many others, therefore, continue to be furnished on multiple floppy disks. Many of these programs have become so diverse that as many as 20 to 40 floppy disks may be required to install a complete set of programs on a host computer.

What is needed is a means whereby vendors of large and diverse applications can record all of an application on a single CD-ROM, and then selectively enable access of portions of the data at time of purchase. Also a means is needed to copy-protect CD-ROM disks so floppies are not the sole means for protection. With these improvements a vendor could cost-effectively mass-produce one full version of a product on a single CD-ROM disk, have the disk copy-protected, and selectively control use of its applications. The user, who only has to make a one-time purchase of a basic package on a single disk, could have access to other applications on the disk by simply paying the vendor for them as needed.

SUMMARY OF THE INVENTION

In an embodiment of the present invention, a method for providing data in a secure fashion on a compact disk read-only memory (CD-ROM) disk and enabling retrieval of the data by a host computer is provided, comprising steps of (1) storing data on the disk in the manufacturing process; and (2) programming a password into the CD-ROM disk after manufacture of the CD-ROM disk by altering selected sectors on the CD-ROM disk to be unreadable by conventional laser-read control routines. The digital sequence comprising the password is a digital sequence identified by a sequence of readable and unreadable sectors. The password is characterized by being programmed in the programming area of the CD-ROM over a region having at least one megabyte of data storage capacity, which is a large enough area to defeat known interception programs and schemes.

In some cases, the data to be read may be recorded in an encrypted fashion, and the password is really a decryption key.

In another aspect of the invention multiple features and versions of a large program may be placed on a single CD-ROM disk, and selected portions enabled at point of sale by programming on the disk selected passwords and/or decryption keys.

BRIEF DESCRIPTION OF THE DRAWINGS

FIG. 1 is an illustration of addressable sector content in the prior art for a sector on a CD-ROM.

FIG. 2 is a section view through a track of a CD-ROM in the prior art, showing indentions for indicating bit transitions.

FIG. 3 is a plan view of a CD-PROM in an embodiment of the present invention, showing data storage and programming regions.

FIG. 4A is an isometric view of a programming device according to an embodiment of the invention.

FIG. 4B is a largely diagrammatical view of internal elements of the programming device of FIG. 4A.

FIG. 4C is a section view of a CD-ROM mounted in the programming device of FIG. 4B and 4A, showing the relative convergence of a focused laser beam in the device.

DESCRIPTION OF THE PREFERRED EMBODIMENTS

Figure 5:
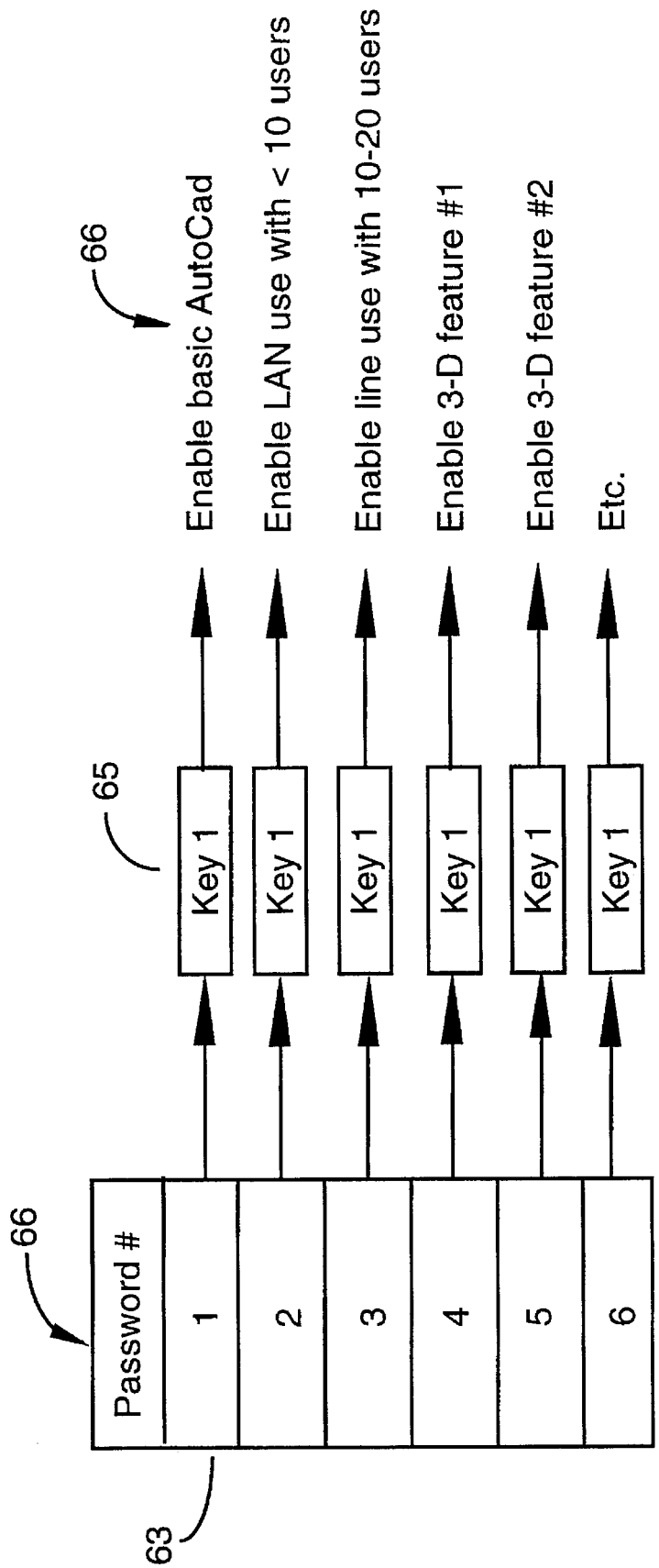
FIG. 5 is an illustration of the concept of passwords as decryption keys according to an embodiment of the invention.

The present invention, termed CD-PROM for Compact Disk Programmable Read Only Memory, is in one aspect a means for selectively enabling data on CD-ROM disks after mastering and pressing but before providing the disks to an end user. The data storage capacity of a conventional CD-ROM disk is about 600 megabytes. Of that amount, some few megabytes are typically devoted to the disk's operating system (OS). Typically large applications programs such as Windows, Ethernet, and AutoCad require no more than 100 megabytes of storage area. That leaves nearly 500 megabytes of data storage area free for use in access enablement schemes and other programming.

The present invention involves in one aspect encoding into a CD-PROM disk, by a unique laser programming means, digital patterns comprising coded passwords that enable access to selected data on the disk.

FIG. 3 is a plan view of a CD-PROM disk 31 according to an embodiment of the present invention. A small region 33 near inside opening 32 is dedicated to the disk's operating system (OS). This OS is automatically loaded on a host computer when a disk is placed in the drive of an attached optical disk player, assuming the computer control system has been configured for the drive. Region 35 on the disk, occupying perhaps 100 megabytes, is used for data storage. In this region all data pertinent to an application may be stored. For example, for a program like AutoCad, all features, versions, etc. are stored in region 35. The size of region 35 is variable, depending on the application.

All of the data in region 35 is encrypted. A multitude of schemes exist for doing such encryptions such as reverse alphabet, letter substitution, word inversion, number-to-letter substitution, and variations of combinations of these and many other methods.

The remainder of the CD-PROM disk, region 37, which may be typically up to about 500 megabytes in usable capacity, is the programming area. In this area passwords are recorded and programming is done. The means of enabling various parts of data region 35 are provided in programming area 37.

FIG. 4A is an isometric view of a laser programming device 39 according to an embodiment of the invention. Externally device 39 may appear much like a conventional CD-ROM disk drive. It has in this embodiment a disk tray 41 for receiving a CD-ROM disk 34, an open/close actuator 43, and a dip switch 45. In other embodiments, there may be other control actuators as well.

Laser programming device 39 also resembles a conventional CD-ROM disk drive internally, except where the read laser unit is typically installed, a higher-power laser unit is used that is capable of destroying sectors on a CD-PROM disk. Also, the laser unit in device 39 is controllable to selectively destroy sectors to accomplish a programming function.

FIG. 4B is a largely diagrammatical illustration of internal elements of programming device 39. The electronic circuitry is quite similar to that of a standard CD-ROM disk drive and is not diagrammed in FIG. 4B.

To operate programming device 39, a CD-ROM disk 34 is placed in disk drawer 41 with its read side down, that is, the reflective layer is on the side opposite the laser device. A laser system generally indicated by elements 46, comprising a laser, focusing elements, and tracking mechanisms, is located in about the position the corresponding elements would be located in a CD-ROM drive.

Control routines operating on a host computer 57 in this embodiment over a communication link 47 to on-board control circuitry 52 provide control operations to drive programming device 39. The same control routines provide a user-interface on the host computer display, allowing an operator to control and alter the operations of device 39.

In operation a laser beam 49 is selectively enabled from laser emission device 50 when a signal is received from the host. Beam 49 is focused in this embodiment through a prism 51 and an objective lens 53 onto the spiral track of CD-ROM disk 34. Actuators 58 control focusing adjustments, drive 55 spins the CD-ROM disk, and translation actuator 56 shifts the laser system radially along rails to follow the spiral track.

FIG. 4C is an enlarged section through one portion of a spiral track of CD-ROM disk 34 with laser beam 49 focused through the thickness of the disk onto the indentions in the spiral track. The thickness D1 of a CD-ROM is typically about 1.2 mm, and the depth D2 of the depressions is typically about 0.12 micrometers. A track is typically about 0.6 micrometers wide, and the dimension between tracks is typically about 1.6 micrometers. In this section, the disk is shown with a lacquer topcoat 36.

It is seen, then, that the magnitude of the depressions in the surface of the CD-ROM disk is but a very small portion of the thickness of the disk, and the depressions themselves are quite shallow.

Keeping in mind the relative and typical dimensions given above, there are at least two mechanisms by which the energy from laser beam 49 may be concentrated at the spiral track, in a manner that is not injurious to the bulk of the disk, and whereby selected sectors in the track may be altered in a manner to be unreadable by a conventional reading mechanism. One means is by focusing beam 49 at a large included angle A so the power per unit area remains proportionally small until the track region is reached. Another is by selecting the wavelength for the laser to be a wavelength for which the material of the disk is relatively transparent. In different embodiments of the present invention, different combinations are used. Also, the presence of the reflective layer immediately at the track interface is an aid in obliterating data recordation in selected areas, as a portion of the laser energy tends to be reflected at this interface. Moreover, alteration or local destruction of the reflective layer itself by the energy of beam 49 has been found to contribute to the ability to obliterate selected sectors.

In embodiments of the present invention the pattern of sectors damaged or destroyed and not damaged or destroyed sequentially along the spiral track in region 37 (see FIG. 3) becomes a recognizable digital string for use by the operating system in decrypting data stored in region 35. Literally any programmed information may then be placed in a selected region on a CD-ROM disk, providing therefrom a CD-PROM disk according to a preferred embodiment of the present invention.

It is not necessary that an enabling password or other programmed data be in a serial sequence. There can be patterns within patterns, and the organization of sectors to produce a single password or data for another purpose might be scattered over entire programming region 37. There may be many passwords on a disk, each capable of enabling a different application.

The concept of password enablement as practiced in embodiments of the present invention is illustrated with the aid of FIG. 5, which shows an index table 61 of passwords 63, each yielding a digital key 65 to enable a selected portion of (for example) a region 37 on a CD-PROM according to an embodiment of the invention. The selected portion keyed by such a password may be an application 66 such as AutoCad, or some other useful, and separable, data group, as indicated in FIG. 5. The individual keys enable separately bootable features or versions of the application.

Such a password table is, of course, a useful mechanism for understanding the selective enablement concept of the present invention. This password table does not really ever get written to memory anywhere. If it did, it could be copied and used to break the code. Instead, the ability to find passwords is programmed into the OS, and the actual passwords are discarded as quickly as used.

Figure 6:
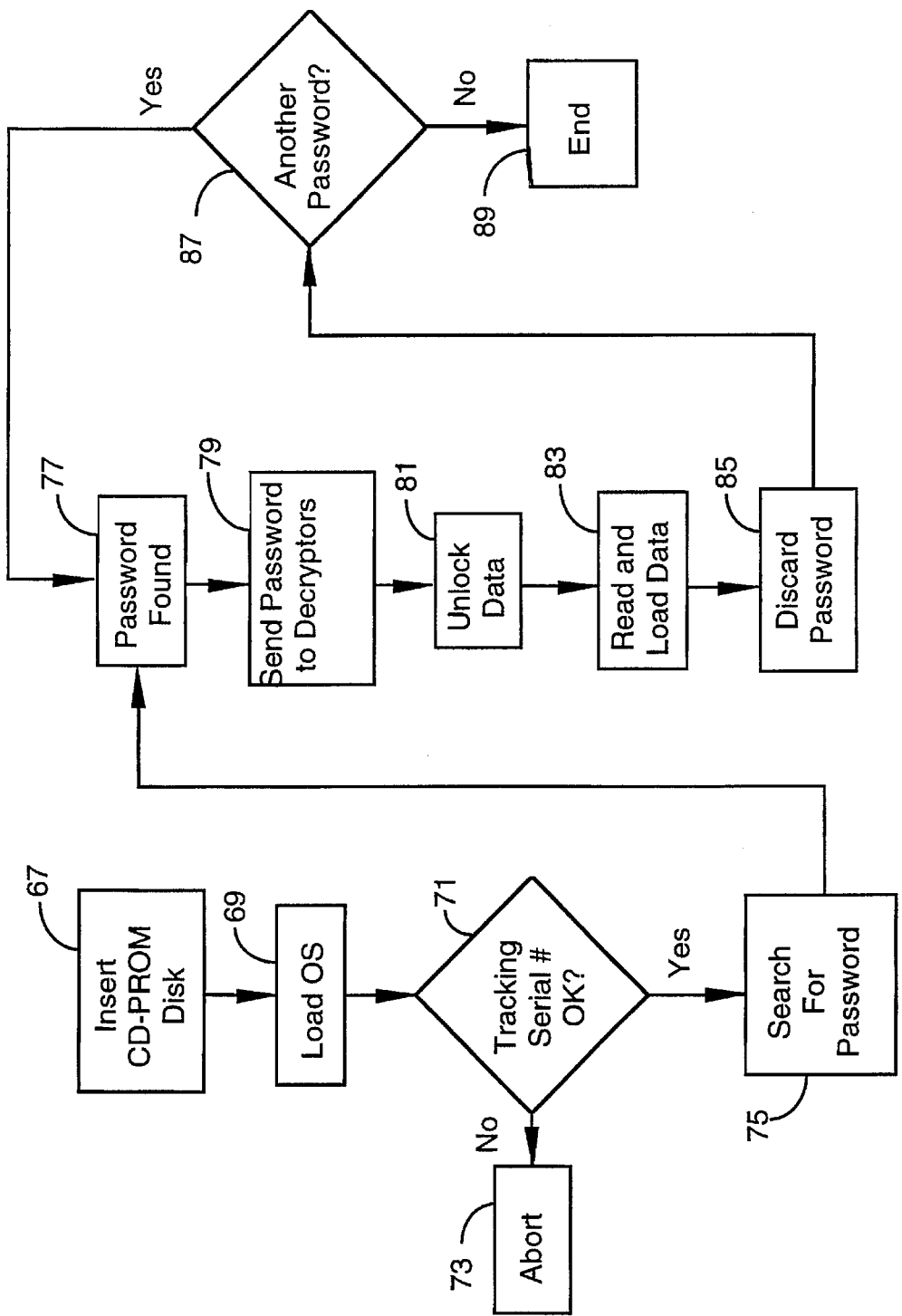
FIG. 6 is a logic flow diagram indicating the steps in a method of decrypting data according to an embodiment of the invention.

A password enablement scheme according to an embodiment of the present invention is flowcharted in FIG. 6. At the start, a CD-PROM disk is inserted in the disk drive at event 67. The OS program is loaded on the computer at event 69. An early function is checking for a serial number at function 71 (at the discretion of the vendor). In this particular path, if the licensing serial number does not check, the enablement process may be aborted (function 73). The OS in this embodiment next searches programming region 37 for a first password (function 75).

When the OS finds a password at function 77, the password is passed to the decryptors at function 79, and used to unlock data keyed addresses. The system then reads the unlocked data (function 83), typically loading the decrypted data to a location on the host system's hard disk. At function 85 the password is discarded. The discarding function is not necessarily a separate step in the operation, and may be a natural function of the data flow as controlled by the operating system.

After all the passwords are found and the data meant to be accessible is accessed, control passes to end function 89.

"Unlocking" with a password can be as simple as enabling a sequential range of sectors by beginning address and length to be read into memory or it can be extremely complex. An example of a simple unlocking scheme would be the case where a password gives instructions to "read every 5th sector in a range beginning at a specific address." Another scheme could change the unlocking instruction on a daily basis by requiring, for example, "if it is the 23rd hour of the day, a predefined number be added to every 6th sector."

An example of a more complex unlocking scheme could be as follows: The OS looks for password #1, say an 8-bit digital word, and finds it. This password is a key for an algorithm to be loaded that searches for another key in data region 37 in one of 24 different patterns, one pattern for each hour of the day, as determined by querying the clock on the computer. Password #2 is the actual enabling key that is available from all 24 search patterns or any one of them. The added factor of basing the search on time with the first password effectively adds another layer that a person would have to solve to defeat the system.

In another embodiment of the invention there can be a means of sending an enabling password to a user who wants to access more applications on a CD-PROM disk than he/she originally purchased. In this embodiment a user interface in the form of a query from the computer to enter the actual password would not be needed. Instead the password could be an addition to the CONFIG.SYS file, a keystroke sequence, or other means to enable the OS to find the password key already on the CD-PROM disk to unlock the desired application in data region 37.

An additional feature is the built-in copy-protection that CD-PROM provides with the data on the disk being encrypted. The disk can be copied but the encrypted data will be unusable. With the CD-PROM disk itself copy-protected, the more vulnerable method of providing copy protection on a companion floppy disk is not necessary.

Because of the large capacity of programming region 37, there is a very broad range of possibilities in programming. For instance, the system can be used by companies that sell mailing lists to track the use of the lists. An entire mailing list can be sold on a single CD-PROM together with all the necessary routines to use it to print labels, cards, or even "self-mailers." These companies could charge for a mailing list on CD-PROM based on the number of times the user uses the mailing list. Programming on the CD-PROM disk along with the OS could be used to customize the list to include a fictitious recipient with an address that goes to the vendor. In this way the vendor would receive a mailer addressed to the fictitious party every time the customer uses the mailing list. This would enable the vendor to keep track of how many times the mailing list is actually being used.

In yet another embodiment of the present invention, a data area of several hundred sectors, comprising several megabytes of storage area, is selected, and a password is programmed in the area by damaging selected sectors on the CD-ROM, as is described above. The area of several hundred sectors extends along the spiral recording track of the CD-ROM from the first damaged sector to the last, and may be considered a "protect" area. When the CD-ROM is presented to a host computer with a CD-ROM drive, the password must be entered, as in other systems, or the CD-ROM cannot be read.

The efficacy of this embodiment lies in the fact that, to copy the data on the protected CD-ROM, one must employ an "interceptor" program, and such programs must copy the entire protect area to RAM on a host to read the data on the CD-ROM. As there are practical limits to the on-board RAM for most computers that are also used for reading CD-ROMS, it is only necessary to be sure the protect area is larger than the RAM complement of a host. In some cases it will be necessary to have "good" data in the undamaged sectors in such a protect area, and this is accomplished by pre-writing, at the time of manufacture, arbitrary data to an area of the proper size where the password will be later programmed by damaging selected sectors.

It is common, at the time of this application, to have as much as 16 megabytes of RAM on a personal computer, but the purpose of such large RAM is to be able to run relatively large operating systems, secondary systems like Windows™, and ever larger applications. After loading all the necessary software to RAM, there will seldom be, in even such a RAM-rich system, more than two to four megabytes of memory free for use with an interceptor program to defeat a super password of the sort contemplated by the present invention.

The inventor is confident that a password area of 1 magabyte would be sufficient to defeat an interceptor program for many existing personal computers, and that a password area of 4 megabytes would defeat interceptors for all but a very few existing personal computers.

The super-password concept of passwords too large to be handled by interceptor programs and techniques is also applicable to decrypting keywords and the like, as described in a number of different embodiments above, and to multiple passwords and keywords for enabling and decrypting multiple applications and versions of applications on a CD-ROM. For example, given a recording area of 100 megabytes, as shown in FIG. 3, and a programming area of as much as 500 megabytes, as also shown in FIG. 3, one could program a relatively large number of passwords and keywords in the 500 megabyte area for selectively enabling and decrypting an equally large number of different portions of data in a data region. In an area of 500 megabytes, for example, one could program fifty ten-megabyte passwords and keywords, each extending over a ten-megabyte protect area.

It will be apparent to one skilled in the art that there are many changes that may be made in the embodiments described without departing from the spirit and scope of the present invention. Some alternatives have been described above. For example, provisions may be made to add a secondary level of access control to give the user the option to "pay as you go" for extra applications that are available on the CD-PROM disk. Another variation adds a copy protection scheme to the CD-PROM disk.

There are also a number of equivalent ways the several features described for the invention might be implemented without departing from the spirit and scope of invention as well. For example, the aforedescribed embodiments could be rendered in different sizes. For instance, data bases exist today that are larger than 500 megabytes and can not fit on a single CD-PROM disk. The concept of a single CD-PROM disk presented in this invention could be expanded to the production of a set of CD-PROM disks as a way to accommodate extra large data bases in an orderly manner and still provide enablement control and copy protection on the single disks. Another variation would utilize one or more of the large 12-inch size video disks for CD-PROM storage as dictated by the size of the data base. Many other such alterations fall within the spirit and scope of the invention.

What is claimed is:

1. A method for providing digital information to a host computer in a secure fashion on a compact disk read-only memory (CD-ROM), wherein information is recorded in physical structure of a recording track, comprising steps of:

(a) providing the digital information in formatted sectors of a recording region on the CD-ROM; and (b) programming a password into a programming region on the CD-ROM by damaging the physical structure of the recording track in selected sectors in the programming region, forming thereby a sequence of physically damaged and undamaged sectors, the sequence providing the password for use in enabling reading of the digital information in the recording region by a host computer;

wherein the password is recorded over an area of the programming region having a digital storage capacity of at least one megabyte of data storage.

2. The method of claim 1 wherein the password extends over an area of at least four megabytes of data storage.

3. The method of claim 1 wherein the digital information is provided on the CD-ROM in an encrypted fashion requiring a keyword for decryption, and the password programmed into the programming region is the keyword for decrypting the encrypted digital information.

4. The method of claim 1 wherein the digital information comprises plural files, each requiring a separate password to be accessed, and wherein separate passwords are programmed into the programming region for enabling the separate files.

5. The method of claim 3 wherein the digital information comprises plural encrypted files, each requiring a separate keyword to be decrypted, and wherein separate keywords are programmed into the programming region for decrypting the plural encrypted files.

6. A method for providing access control to only individual computer files purchased by a customer of multiple computer files stored on a compact disk read-only memory (CD-ROM), wherein information is recorded in physical structure of a recording track, comprising the steps of:

(a) providing the individual computer files in formatted sectors of a recording region on a compact disk read-only memory (CD-ROM);

(b) programming digital passwords for enabling access to only the computer files purchased by a customer into a programming region of the CD-ROM by damaging the physical structure of the recording track in selected sectors in the programming region, forming thereby a sequence of physically damaged and undamaged sectors;

wherein the passwords are recorded over an area of the programming region having a digital storage capacity of at least one megabyte of data storage.

7. The method of claim 6 wherein the individual files are recorded on the CD-ROM in an encrypted fashion requiring a keyword for decryption, and the password programmed into the programming region is the keyword for decrypting the encrypted digital information.

8. A compact disk read-only memory (CD-ROM), comprising:

a recording region wherein digital information is recorded digitally by physical structure within formatted sectors along a spiral track; and a programming region having formatted sectors wherein a password is recorded by selectively damaging the physical structure of the data track in selected sectors in the programming region, forming thereby a sequence of physically damaged and undamaged sectors, the sequence providing the password for use in enabling access to the digital information recorded in the recording region;

wherein the password is recorded over an area of the programming region having a digital storage capacity of at least one megabyte of data storage.

9. A compact disk read-only memory as in claim 8, wherein the digital information recorded in the recording region is recorded in an encrypted fashion, and the password recorded in the programming region is a digital keyword for use in decrypting the digital information recorded in the recording region.

* * * * *